United States Patent
Fukushima

[19]

[11] Patent Number: 5,903,700
[45] Date of Patent: *May 11, 1999

[54] INFORMATION RECORDING/REPRODUCING APPARATUS CAPABLE OF CHANGING ITS OPERATIONS BASED ON CHARACTERISTIC DATA OF A CAMERA CONNECTED THERETO

[75] Inventor: Nobuo Fukushima, Yokohama, Japan

[73] Assignee: Canon Kabushiki Kaisha, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/332,060

[22] Filed: Nov. 1, 1994

[30] Foreign Application Priority Data

Nov. 1, 1993 [JP] Japan .................................... 5-282444

[51] Int. Cl.[6] .............................. H04N 5/91; H04N 5/225
[52] U.S. Cl. ............................. 386/46; 386/107; 386/117
[58] Field of Search .................................... 358/335, 342, 358/310, 906, 909.1; 348/222, 207, 231, 232, 372; 360/32, 33.1; 386/107, 117, 118; H04N 5/91, 5/225

[56] References Cited

U.S. PATENT DOCUMENTS

| | | |
|---|---|---|
| 4,827,333 | 5/1989 | Iwake . |
| 5,040,068 | 8/1991 | Parulski et al. .......................... 358/335 |
| 5,317,404 | 5/1994 | Fukushima et al. ..................... 358/335 |
| 5,382,976 | 1/1995 | Hibbard .................................. 348/273 |
| 5,477,264 | 12/1995 | Sarbadhikari et al. ................. 348/231 |
| 5,633,976 | 5/1997 | Ogino ..................................... 386/120 |

*Primary Examiner*—Robert Chevalier
*Attorney, Agent, or Firm*—Fitzpatrick, Cella, Harper & Scinto

[57] ABSTRACT

An information recording/reproducing apparatus for recording and reproducing information while coupled to a camera includes a memory. A processor is provided for (1) receiving from the camera characteristic data which corresponds to an operational characteristics of the camera, (2) storing the characteristic data in the memory, (3) performing an information recording/reproducing operation based on the stored characteristic data, (4) detecting a change in an operational characteristic of the connected camera, (5) storing in the memory changed characteristic data that corresponds to the detected change in an operational characteristic of the connected camera, and (6) performing a further information recording/reproducing operation based on the stored changed characteristic data

44 Claims, 7 Drawing Sheets

INFORMATION RECORDING/REPRODUCING APPARATUS CAPABLE OF CHANGING ITS OPERATIONS BASED ON CHARACTERISTIC DATA OF A CAMERA CONNECTED THERETO

BACKGROUND OF THE INVENTION

1. Field of the Invention

This invention relates to an information recording/reproducing apparatus, such as a video recorder or the like, to the main body of which a camera unit can be connected.

2. Description of the Related Art

FIG. 8 is a schematic diagram illustrating a camera unit 11 connected to the main body of a conventional information recording/reproducing apparatus 12.

In FIG. 8, reference numeral 1 represents the main body of the information recording/reproducing apparatus. Reference numeral 2 represents a display unit of the apparatus. Reference numeral 3 represents an operation button (such as a start record button). A pointing device 4 (such as a mouse or track ball) is used for moving a cursor or indicating a portion of the display unit 2 when the cursor is displayed on the display unit 2. A connection adapter 5 is used for connecting the camera unit 11 to the apparatus 12.

A cable 6 connects the camera unit 11 to the apparatus 12, and incorporates a power-supply line for supplying electric power from the apparatus 12 to the camera unit 11, a communication line between the apparatus 12 and the camera unit 11, and the like.

There are also shown the camera body 7 of the camera unit 11, a photographing lens 8, and an illuminating member 9, such as a stroboscopic lamp or the like, for illuminating an object. A trigger switch 10 for a photographing operation corresponds to a shutter button in a silver-film camera.

A battery (not shown in FIG. 8) is incorporated in the apparatus 12 as a power supply, so that electric power is supplied to the apparatus 12 and the camera unit 11.

In the above-described conventional apparatus, the following problem arises when, for example, a color camera for photographing general objects is coupled to apparatus 12, the photographing situation has changed for some reason, and the camera must be replaced by a black-and-white camera for inputting character data.

That is, in the conventional information recording/reproducing apparatus, when a color camera is connected, information relating to the camera (such as lens information, power-supply information, color information and the like) is registered in a configuration-information storage unit within the information recording/reproducing apparatus. When a black-and-white camera is newly connected, the configuration information must be replaced by configuration information relating to the black-and-white camera. Such an operation is very troublesome for the operator.

SUMMARY OF THE INVENTION

It is an object of the present invention to solve the above-described problem.

It is another object of the present invention to provide an information recording/reproducing apparatus in which at least one of the parameters of the apparatus is automatically updated within the apparatus by detecting that at least a portion of a camera unit has been exchanged.

According to one aspect of the present inventions which achieves these objects, an information recording/reproducing apparatus for recording and reproducing information while connected to a camera comprises image display means, means for selectively switching between electric power supplies, a power-supply battery for supplying electric power to the apparatus and the camera connected thereto, means for performing communication with the connected camera, camera-function inputting/determining means for inputting and determining the functions of the connected camera, control means for controlling the apparatus in accordance with the functions of the connected camera, and storage means for storing control data. The control means controls an operation of the apparatus by changing the operation in accordance with a change in the functions of the connected camera.

According to the above-described configuration, when, for example, the camera has been replaced, so that a change has been produced in the functions of the camera, the camera-function input/determining means determines the change, whereby the control means can appropriately control the operation of the apparatus in accordance with the change. Hence the operator can perform recording/reproducing operations by utilizing the functions of the connected camera without performing troublesome function-changing processing.

Another aspect of the present invention relates to an image pickup apparatus comprising image pickup means, first transmission means for transmitting an output from the image pickup means to an external apparatus, and second transmission means for transmitting characteristic data of the image pickup apparatus to the external apparatus.

Still another aspect of the present invention relates to an electronic apparatus capable of connecting an image pickup apparatus thereto, comprising first reception means for receiving image data from the image pickup apparatus, second reception means for receiving characteristic data of the image pickup apparatus from the image pickup apparatus, and processing means for processing the data received by the first and second reception means.

Yet another aspect of the present invention relates to a recording and/or reproducing apparatus, comprising communication means for performing communication with a peripheral apparatus connected thereto, and changing means for changing the contents of a configuration memory within the recording and/or reproducing apparatus by receiving characteristic data of the peripheral apparatus upon initialization of the recording and/or reproducing apparatus.

The foregoing and other objects, advantages, and features of the present invention will become more apparent from the following detailed description of the preferred embodiments taken in conjuction with the accompanying drawings.

DETAILED DESCRIPTION OF THE PREFERRED EMBODIMENTS

A description will now be provided of an information recording/reproducing apparatus according to the present invention.

Figure 1:
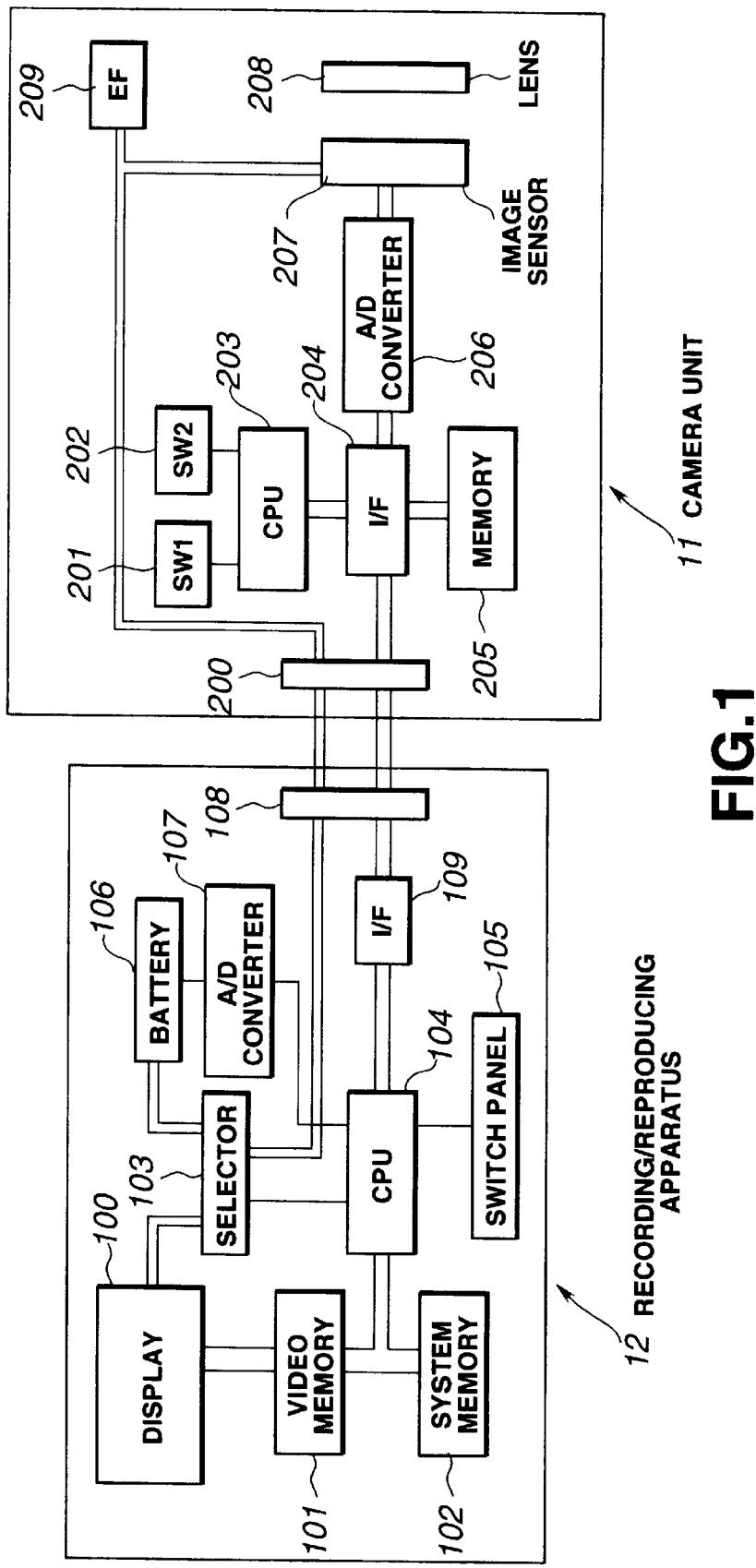
FIG. 1 is a block diagram illustrating an information recording/reproducing apparatus and a camera unit according to the present invention.

FIG. 1 is a block diagram illustrating an information recording/reproducing apparatus 12 and a camera unit 11 to which the present invention is applied. The basic configuration of the apparatus is the same as that shown in FIG. 8.

Figure 8:
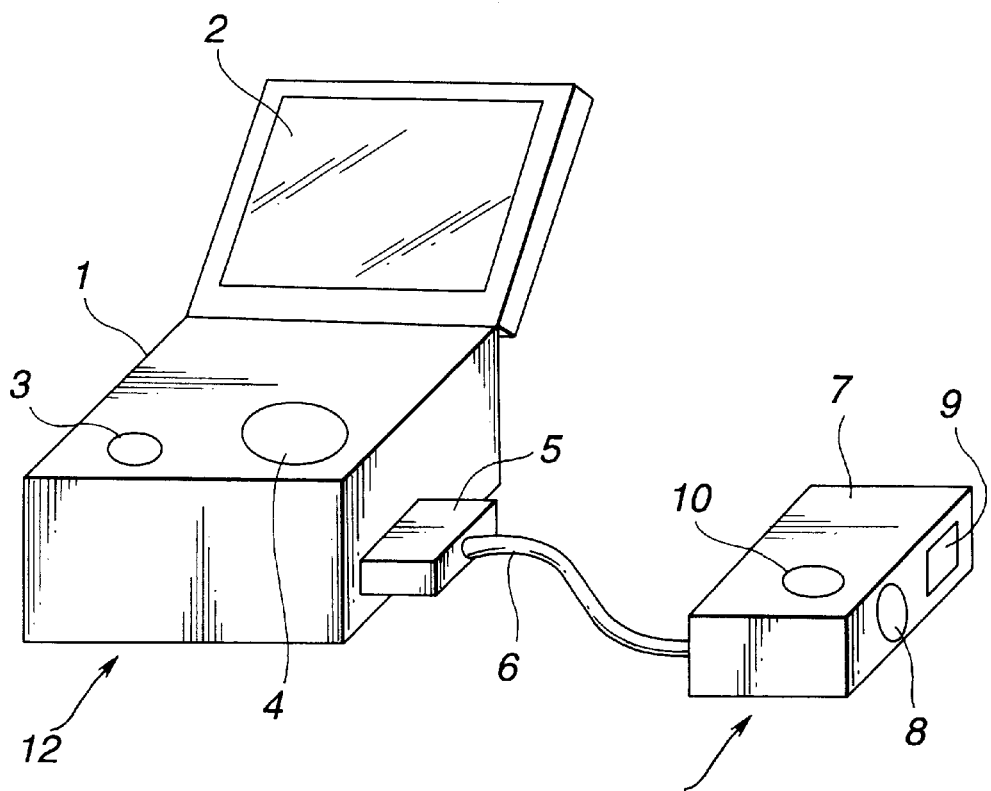
FIG. 8 is a block diagram illustrating an information recording/reproducing apparatus and a camera unit in a conventional approach.

In FIG. 1, 12 indicates the information recording/reproducing apparatus, which corresponds to the apparatus shown in FIG. 8, Similarly, camera unit 11 corressponds to the unit shown in FIG. 8.

In FIG. 1, there are shown a display 100, a video memory 101 for the display, a system memory 102 for controlling the information recording/reproducing apparatus, and selector 103 for selectively switching between electric power supplies. A microprocessor (CPU (central processing unit)) 104 controls the information recording/reproducing apparatus. An operation switching panel 105 comprises an operation button, a pointing device and the like.

A battery 106 supplies electric power to the apparatus 12 and the camera unit 11, An A/D converter 107 digitizes a voltage value of the battery 106, A connector 108, provided with the apparatus 12, mechanically connects the apparatus 12 to the camera unit 11, Reference numeral 10, represents an interface for communication between the information recording/reproducing apparatus and the camera unit.

A connector 200, provided with the camera unit 11, mechanically connects the camera unit to the apparatus 12, There are also shown a standby switch 201 for a photographing operation (typically closed by pressing the shutter button halfway down), a photographing trigger switch 202 (typically closed by pressing the shutter button all the way down), a microprocessor 203 for controlling the camera unit 11, an interface 204, provided with the camera unit 11, for communication between the apparatus 12 and the camera unit 11, a memory 205 for temporarily storing photographed data, an A/D converter 206 for digitizing an output from an image sensor 207 (such as a CCD (charge-coupled device) or the like), an imaging lens 208, and illuminating means 209 (such as a stroboscopic lamp (an electric flash) or the like), for illuminating an object. Thick lines from the battery 106 and the power-supply selector 103 represent power-supply lines.

Figure 2A:
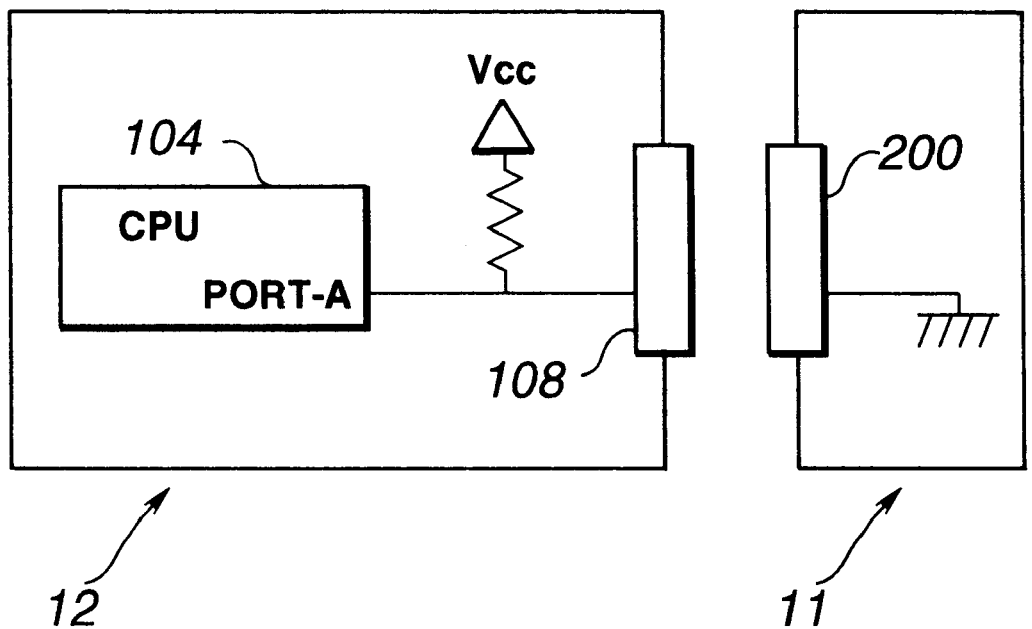
FIGS. 2(a) and 2(b) are block diagrams illustrating a manner of detecting the connection of the camera unit in the present invention.
Figure 2B:
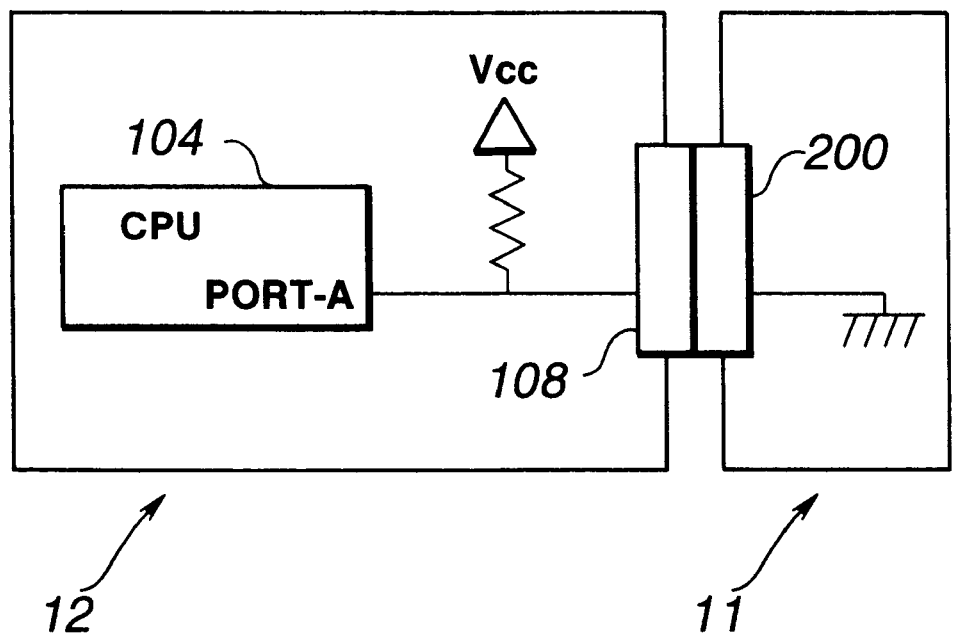

FIGS. 2(a) and 2(b) are block diagrams illustrating a manner of detecting the connection of the camera unit 11 to the apparatus 12. Reference numerals 104, 108 and 200 shown in FIGS. 2(a) and 2(b) represent components having the same reference numerals shown in FIG. 1, and therefore a description thereof will be omitted.

FIG. 2(a) illustrates a state in which the camera unit is not connected to apparatus 12. In this states a PORT-A of the CPU 104 assumes a high level.

FIG. 2(b) illustrates a state in which the camera unit is connected to apparatus 12. In this state, the PORT-A of the CPU 104 assumes a low level.

First Embodiment

Figure 3:
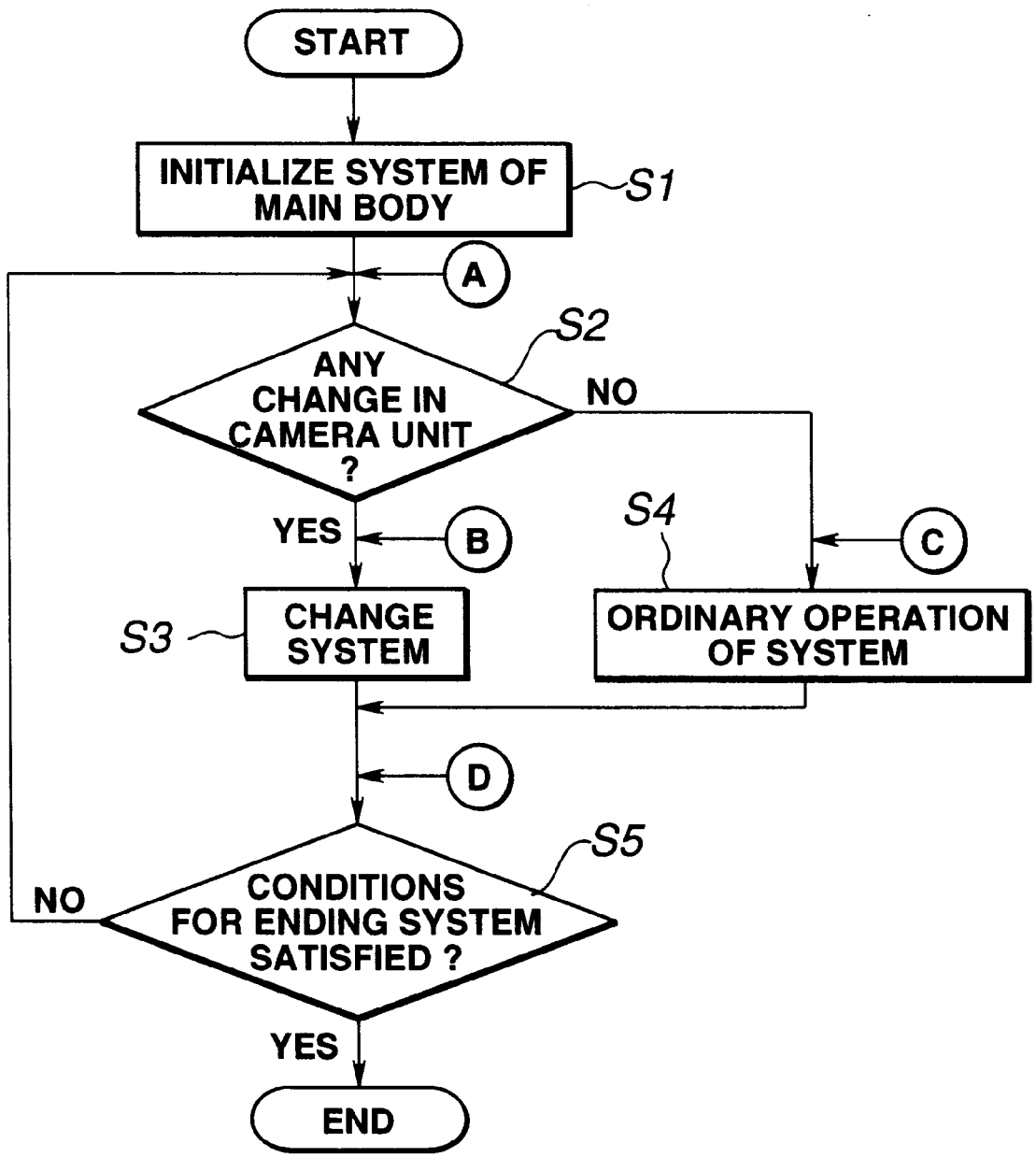
FIG. 3 is a flowchart illustrating the operation of a first embodiment of the present invention.

A description will now be provided of the operation of a first embodiment of the present invention with reference to the flowchart shown in FIG. 3.

Figure 4:
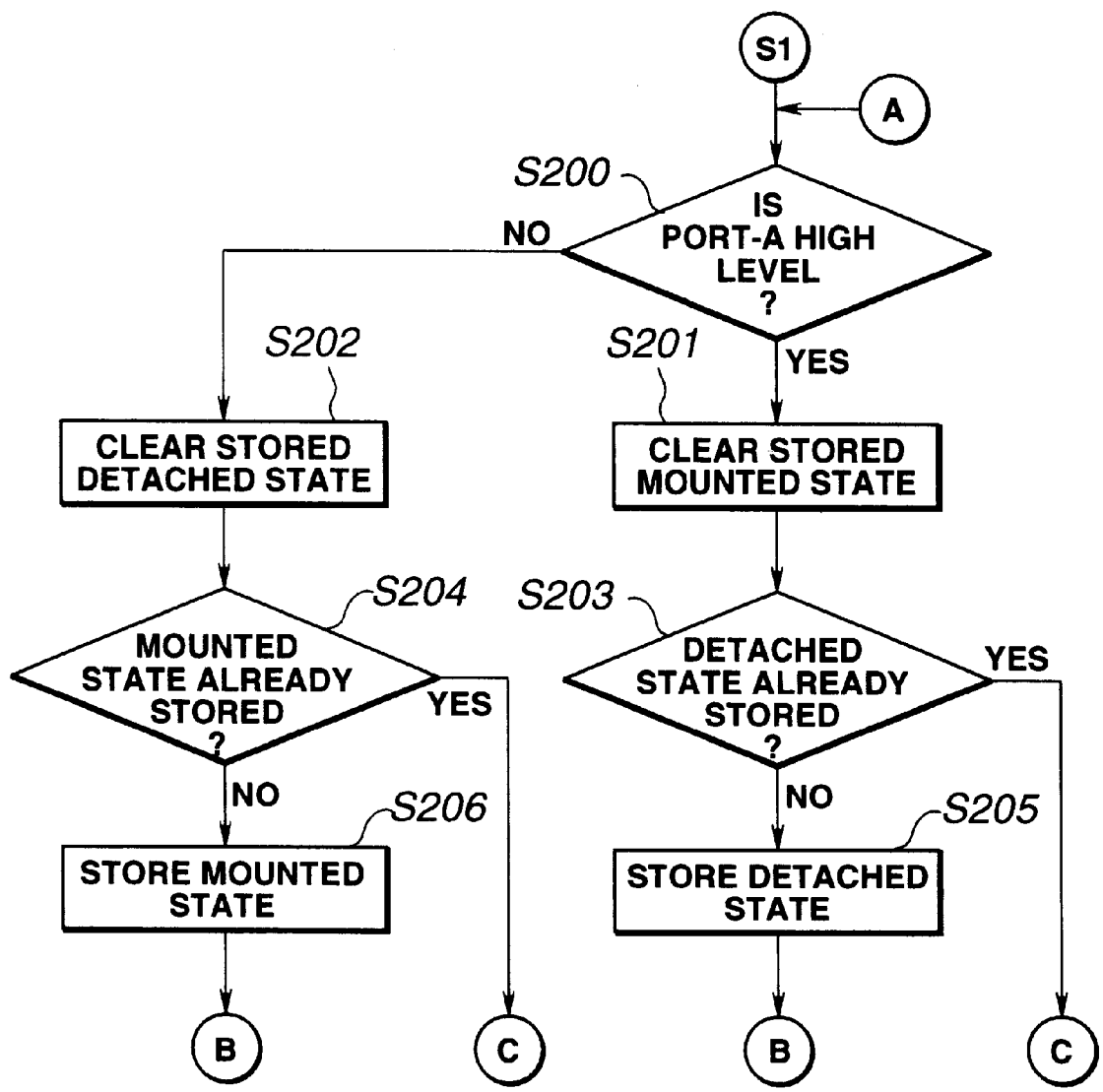
FIG. 4 is a flowchart illustrating a routine of determining a change in the camera unit in the first embodiment.

In step S1, the system of the apparatus 12 is initialized. In step S2, it is checked if there is a change in the camera unit 11. For example, it is checked if the camera unit 11 has been connected. The routine of the check is shown in FIG. 4, and will be described later. If the result of the check is affirmative, the process proceeds to step S3. If the result of the check is negative, the process proceeds to step S4, where an ordinary operation may be performed without changing the system.

Figure 5:
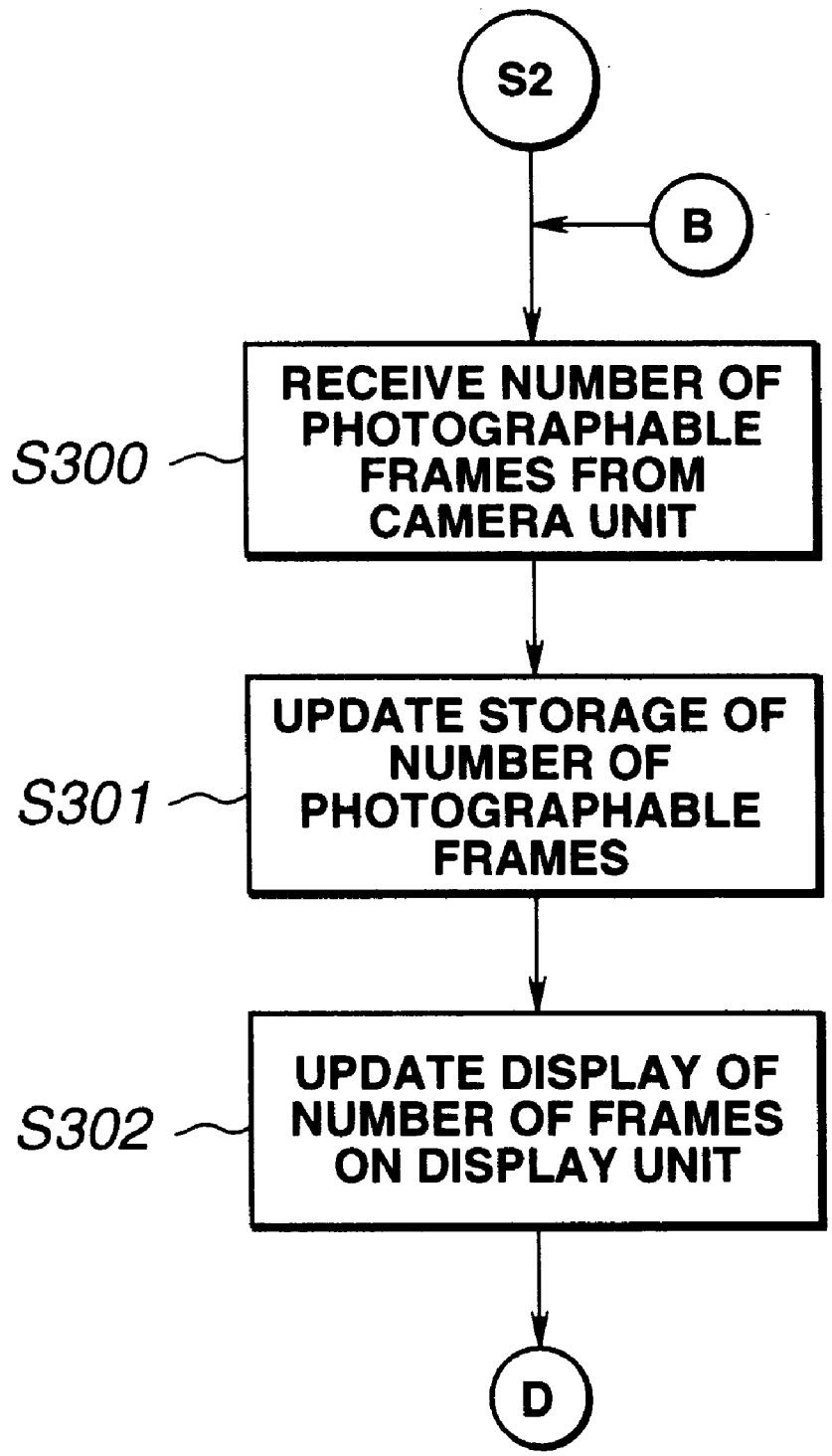
FIG. 5 is a flowchart illustrating a routine of changing the system in the first embodiment.

In step S3, the system is changed. For example, as shown in FIG. 5, the number of photographable frames displayed on the display 100 may be changed by changing the parameter relating the number of photographable frames stored in the memory 102 of the apparatus 12.

In step S5, conditions for ending the system operations (such as if a power-supply-off switch having been depressed, if the time counted by a timer for automatic shutdown is up, or the like) are satisfied. If the conditions are satisfied, the main system operations are stopped. If the conditions are not satisfied, the process returns to step S2, and the above-described operations are repeated.

Next, a description will be provided of a routine for determining a change in the camera unit 11 in the above-described step S2, with reference to the flowchart of FIG. 4.

In step S200, it is checked if the PORT-A of the CPU 104 is a high level. If the result of the check is affirmative, the process proceeds to step S201 since the camera unit 11 is not connected. If the result of the check is negative, the process proceeds to step S202 since the camera unit 11 is connected.

In step S201, a mounted (connected) state indication temporarily stored in the system memory 102 is cleared. Then, in step S203, it is checked if a detached state has previously been stored in the memory 102. If the result of the check is affirmative, the process proceeds to C shown in FIG. 3. If the result of the check is negative, the process proceeds to step S205. In step S205, a detached state indication is newly stored, and the process proceeds to B shown in FIG. 3.

In step S202, a detached state indication temporarily stored in memory 102 is cleared. Then, in step S204, it is checked if a mounted state indication has already been stored in memory 102. If the result of the check is affirmative, the process proceeds to C shown in FIG. 3. If the result of the check is negative, the process proceeds to step S206. In step S206, a mounted state indication is newly stored, and the process proceeds to B shown in FIG. 3.

Next, a description will be provided of a routine of changing the system in step S3 shown in FIG. 3, with reference to the flowchart of FIG. 5.

In step S300, the apparatus 12 receives from the camera unit 11 information relating to the number of remaining frames which can be photographed by the camera unit 11.

In step S301, the number of photographable frames is newly stored in memory 102. In step S302, that number is newly displayed on the display 100 in order to notify the operator of the number.

The above-described operations constitute system operation of the information recording/reproducing apparatus.

A modification of the first embodiment, for detecting the connection of the camera unit 11 to the apparatus 12, will now be described. Although in the first embodiment, the connection is checked by reading the level of the PORT-A of the CPU 104, the connection may also be checked through communication between the camera unit 11 and the apparatus 12. That is, if an appropriate response is given during communication it is determined that a correct connection has been performed. If a response is absent or the contents of the response are not appropriate, it is determined that a proper connection has not been performed, or that a module which does not respond as a system has been connected, and the result of the determination is output to a speaker or a display unit as a warning.

A description will now be provided of another modification of the first embodiment when it has been detected that the memory 205 (such as a recording medium) of the camera unit 11 has been replaced.

Although in the first embodiment, the connection between the camera unit 11 and the apparatus 12 is checked, the exchange of a portion of the camera unit, for example, the memory 205, may be detected in a state in which the camera unit 11 is connected to the apparatus 12. In such a case, the storage unit 205 shown in FIG. 1 may comprise an exchangeable recording medium.

A memory card, a hard disk, or the like may be used as the exchangeable recording medium. Since these media are already known, a detailed description thereof will be omitted, but a brief description thereof will be provided. A memory card or a hard disk is detachable via a connectors. Various kinds and shapes can be considered for the connector, and several kinds of physical standards and electrical standards, such as PCMCIA, AT, SCSI and the like, are present for an interfaces. An optimim shape and standards may be adopted in accordance with the object of the system. Since the kind, the capacity and the like of a storage medium can be read via an interface, any storage medium typically can be easily applied to the system of the above-described modification.

A description will now be provided of still another modification of the first embodiment relating to the remaining photographable amount.

Although in the above-described embodiment, the maximum number of photographable frames of the camera unit 11 is set as an item to be changed, the total capacity of the camera memory 205 may be adopted as an item to be changed instead of the number of frames. Alternatively, the remaining amount of the camera memory capacity may be adopted as an item to be changed. In this case, when the remaining amount of memory capacity becomes small, the data stored in memory 205 may automatically be transferred to the memory 101.

Second Embodiment

A description will now be provided of other approaches relating to changes of the connected camera unit 11.

(A) Although in the above-described first embodiment, only the connection of the camera unit 11 to the apparatus 12 and the transfer of the photographable frames information have been described, various other camera operation parameters can be tranferred to apparatus 12, as outlined below.

(A-1)

When an exchange of the camera unit has been detected, the following functional and performance parameters can be provided to the apparatus 12:

Electric power consumption requirements or state;

A change in the allowable continuous photographing speed;

phing speed

Changes in the longest and shortest allowable exposure time;

Changes in the color temperatures the illuminating angle, the electric power consumption and the like of the stroboscopic lamp (illuminating means);

Changes in the number of pixels and the arrangement of color filters of the image sensor;

The operations of mode-changing switches, i.e., a photographing-operation-waiting switch, a photographing-operation-trigger switch, a zooming switch, a stroboscopic-lamp switch, and the like; and A change in the color reproduction range (the spectral sensitivity characteristics)

(A-2)

When a change in the camera power supply has been detected (such as the kind of battery, replacement by a charged battery or a new battery, or a change in the remaining amount of the battery), such information can be transmitted to apparatus 12.

(A-3)

When the exchange of a lens of the camera unit has been detected, information such as the minimun stop value, the maximum stop values color balances various kinds of lens optical aberration information, the F numbers and magnification can be provided to apparatus 12.

(A-4)

When a change in the recording medium (e.g. a hard disk to a flash memory) of the camera unit is detected, the storage capacity or the recording format of the new medium can be provided to apparatus 12.

(A-5)

When changes in the photographing environment of the camera unit (such as the illuminating color temperatures the ambient temperatures humidity, vibration, accelerations and the like) are detected, this information can also be provided to the apparatus 12.

Although in the first embodiment, the number of frames photographable by the camera unit is stored in apparatus memory 102, the following items may also be stored and updated:

(B-1)

Information relating th image sensor 207 (such as the number of pixels, the arrangement of color filters, and the like);

( B-2)

Information relating to lens 208 (such as the F number, magnifications various kinds of aberrations, and the like);

(B-3)

Information relating to the camera power supply (such as the kind, the remaining amount of power and the like of the battery);

(B-4)

Information relating to the power consumption of the camera (such as the power-supply voltage, the maximum peak current, the average consumed current, the standby current and the like);

(B-5)

Information relating to photographed colors (the color temperature of illumination in a photographing operation, characteristics of colors photographed by the camera, the spectral sensitivity, the color reproduction range, and the like) of the camera unit;

(C) Changes in processing as a result of updating any of the above parameters in the information recording/reproducing apparatus may comprise, for example, the following items:

(C-1)

A change in the voltage supplied to the camera unit;

(C-2)

Charging of the battery within the camera module, a change in the charging method, the voltage and the current, etc;

(C-3)

A change in the display method for displaying on the display unit the remaining power of the battery;

(C-4)

Changes in the display resolution, the color correction, the colors, and the size of the display on the display 100;

(C-5)

A change in the signal processing method for the image data when displaying a photographed image;

(C-6)

Changes in the color, the shape, and the movement of the icon indicating the camera on the display 100;

(C-7)

Execution of color correction during a printing operation (so that an image can be printed with color balance which is suitable for the reproducible range of colors of the camera unit);

(C-8)

A change in the use of the memory, such as a reduction of the memory capacity required in memory 101 for display and allocation of the conserved memory space to other processing rather than display;

(C-9)

Transfer of data within the camera unit 11 to the apparatus 12;

(C-10)

Transfer of data from the apparatus 12 to the camera unit 11; and (C-11)

The execution of an operation of focusing the lens 208 of camera unit 11 by transmitting an AF command from the apparatus 12.

The following items may be adopted as change items when changing the system configuration:

(a) Setting of a power supply at the camera unit; and (b) Setting of a display on the camera unit 11 in addition to the display 100 on apparatus 12.

A description will now be provided of a second embodiment of the present invention by selecting typical items from among the above-described items.

Figure 6:
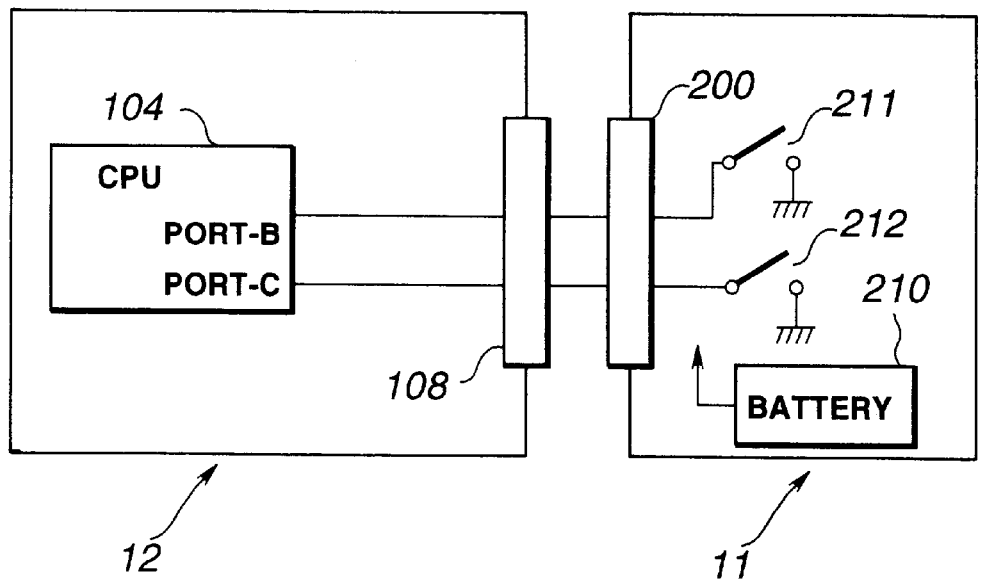
FIG. 6 is a block diagram illustrating a connection between the main body of an apparatus and a camera unit according to a second embodiment of the present invention.

First, as for the system configurations a battery is also provided in the camera unit 11 (see FIG. 6). The change in the camera unit 11 will comprise an operation of exchanging the battery. As for a change in the system of the apparatus 12, it updates information stored in memory 102 relating to the power supply of the camera unit 11. In addition, the display 100 is changed, and charging of the battery of the camera unit 11 is actuated from the main body. The contents of the second embodiment will now be described in detail.

FIG. 6 is a block diagram illustrating additional structure over that shown in FIG. 2.

In FIG. 6, components indicated by reference numerals 104, 108 and 200 correspond to those having the same reference numerals shown in FIG. 2. In the present embodiment, however, PORT-B and PORT-C are added to the CPU 104.

A battery 210 is accommodated within a battery-accommodating case (not shown) of the camera unit 11. A battery-case-cover-open detection switch 211 is switched on when a cover (not shown) of the battery-accommodating case is opened. A battery detection switch 212 is switched on when the battery 210 is present in the battery-accommodating case.

Figure 7:
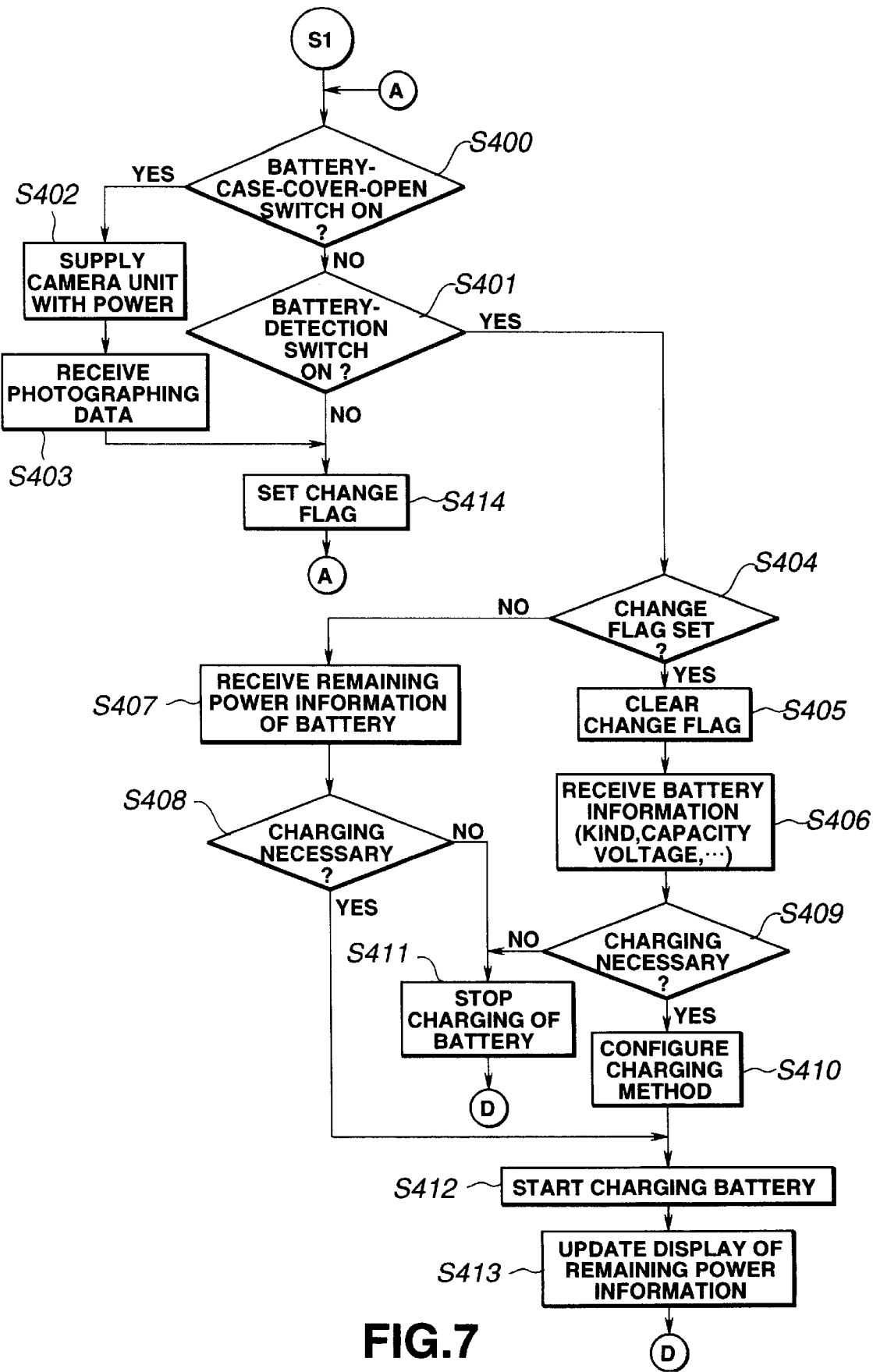
FIG. 7 is a flowchart illustrating the operation of the second embodiment.

FIG. 7 is a flowchart showing one version of steps S2 through S4 of the flowchart shown in FIG. 3. Modes A through D of FIG. 7 are connected to modes A through D of FIG. 3. Therefore, steps in FIG. 7 are added to steps S2 through S4 in FIG. 3.

After the system has been initialized in step S1 shown in FIG. 3, the process proceeds to step S400 shown in FIG. 7.

In step S400, it is checked if the battery-case-cover-open detection switch 211 is switched on. If the result of the check is affirmative, it is determined that the battery-case cover has been opened in order to exchange the battery, and the process proceeds to step S402. If the result of the check is negative, it is determined that the battery has not been exchanged, and the battery-case cover remains closed, or that the battery has been exchanged and the cover has been closed thereafter, and the process proceeds to step S401.

The exchange of the battery can be determined only by checking the battery detection switch 212. However, the operability of the entire system is improved by detecting the intention of the operator to exchange the battery as soon as possible. Accordingly, in the present embodiment, both the battery-case-cover-open detection switch 211 and the battery detection switch 212 are checked. This approach is disadvantageous compared with a case of checking only one of the switches, for example, from the viewpoint of the cost and the space of the apparatus. Accordingly, only one of the switches may be checked in accordance if desired.

That is, in step S401, it is checked by the battery detection switch 212 if the battery is present within the case. If the result of the check is affirmative, the process proceeds to step S404 assuming that the battery is present. If the result of the check is negative, the process proceeds to step S414 assuming that the battery is absent.

In step S402, electric power is supplied from the apparatus 12 to the camera unit 11. If the battery 210 is taken out at this stage, electric power supply to the camera unit 11 is maintained.

In step S403, the main apparatus 12 receives from camera unit 11 data relating to photographed images, data relating to the images (white-balance information, AF information, and the like), data peculilar to the camera unit (the kind of lens used, data relating to the battery, and the like). Although the electric power supply to the camera unit is guaranteed in step S402, there is a possibility of erroneously exchanging the recording medium of the camera unit when the battery is exchanged. Accordingly, in order to protect data of the camera unit stored in the recording medium, data stored in the camera unit recording medium is transmitted to the memory 101, and the process proceeds to step S414.

In step S414, in order to store an indication that the battery has been exchanged, an exchange flag is set, and the process returns to step S400. If the battery-case cover is closed and the battery is accommodated in the case, the process proceeds to step S404.

If the battery detection switch 212 is detected as ON in step S401, in step S404 it is checked if the change flag has been set. If the exchange flag has been set in step S414, the battery case has been opened or the battery is absent. If the change flag is detected as being set in step S404, the process proceeds to step S405. If the change flag is not detected as being set, the process proceeds to step S407 where the remaining power information of the battery 210 is received.

In step S405, the change flag is cleared. In step S406, the apparatus 12 receives battery information from the camera unit. Received information may comprises the kind of battery (a NiCd battery, a Li secondary battery or the like), the capacity of the battery (the maximum capacity at full charging, or the remaining capacity), the voltage (the voltage when a predetermined amount has been discharged, or the current voltage), the charging method ($\Delta V$, $\Delta T$, constant current, or constant voltage), and the like.

In step S409, it is determined if charging of the camera unit battery 210 is necessary. The determination is performed based on the information received in step S406. That is, the detemination is performed, for example, taking into consideration whether or not the remaining power of the battery is less than a predetermined amount, or if the apparatus 12 has the ability to charge the battery 210. Since the specifics of this determination are not directly related to the gist of the present inventions a detalied description thereof will be omitted. If the result of the determination in step S409 is affirmative, the process proceeds to step S410. If the result of the determination in step S409 is negative, the process proceeds to step S411 where charging is stopped.

In step S410, the method of charging battery 210 is configured based on the data received in step S406. For example, if the charging method for the battery of the camera (which had been previously mounted) is the ΔV method, and the charging method for the battery 210 (which has been newly mounted) is the constant voltage method, the charging method is reconfigured from the ΔV method to the constant voltage method. In addition, for example, the charging current is changed whenever necessary.

If charging is not necessary in step S409, in step S411, the charging of the battery is stopped, and the process proceeds to D shown in FIG. 3.

After the charging method has been configured in step S410, in step S412, the battery is charged. However; this does not mean that the process does not proceed to the next step until the charging is completed, but means that charging is started.

In step S413, the remaining power of the newly-installed battery is displayed on the display 100 unit of apparatus 12 or a display unit of the camera unit 11 (not shown), and the process proceeds to D shown in FIG. 3.

If the change flag is detected as not being set in step S404, in step S407 at least the remaining power information of the battery 210 is received from the camera unit 11. Although many kinds of battery information may be received (as in step S406), preferably only the minimal data (such as the remaining voltage and power) are received in order to shorten the communication time. In step S408, it is determined if charging of the battery 210 is necessary, based on the information received in step S407. If the result of the determation is affirmative, the process proceeds to step S412 where charging is started. If the result of the determination is negative, the process proceeds to step S411 where charging is stopped.

After steps S411 and S413, the process returns to step S5 shown in FIG. 3, where it is determined if the conditions for ending the system are satisfied, in the manner described above with reference to FIG. 3, so that the process is terminated or returns to A.

Although in the foregoing description provided with reference to FIGS. 6 and 7, a case in which the apparatus 12 detects the status of switches 211, 212 has been described, the CPU 203 of the camera unit 11 may detect the status of these switches and measure and determine the remaining power information of the battery 210, and then notify the apparatus CPU 104 of this information through data communication.

According to the above-described system operations, where a battery is also provided in the camera unit, the apparatus 12 can update stored information relating to the power supply of the camera unit 11 and change the display on the display 100, or charging of battery 210 can be actuated from the apparatus 12 when battery 210 has been exchanged in the camera unit 11.

Furthermore, by combining the above-described items A through C, various other system operations can be provided in a manner similar to the above-described approach. A description will now be provided of typical examples thereof.

First, as for changes in the functions and the performance of the camera unit 11, when the continuous photographing speed changes, the priority of the tasks performed by the apparatus 12 may be changed. For example, when the continuous photographing speed is high, apparatus 12 may increase the priority of tasks devoted to photographing operations performed by the camera unit 11.

When there is a change in the range of exposure control (such as the longest exposure time, the shortest exposure time or the like) of the camera, the range of warning provided by apparatus 12 may also be changed.

For example, suppose that the range of exposure control of a first camera is between EV1 and EV20, and the range of exposure control of a second camera is between EV1 and EV16. Accordingly, the first camera can photograph a brighter object. When the first camera is connected to apparatus 12, the apparatus 12 generates warning if the brightness of an object exceeds EV20. The warning may be performed, for example, by sound, flashing of a lamp (an LED (light-emitting diode)), or a display on display 100. When the second camera is connected to apparatus 12, the range of the brightness of the object for warning the system is changed so that the apparatus 12 generates a warning if the brightness of the object exceeds EV16.

Next, a description will be provided of a case in which the type of image sensor of the camera unit 12 has changed. For example, when the image sensor of a first camera uses pure-color filters (such as R, G and B filters or the like, and the image sensor of the second camera uses complementary-color filters, such as Y, M and C filters or the like), the signal processing method for displaying an image on display 10 (such as a CRT, an LCD (liquid-crystal display) or the like) is changed between the first camera and the second camera. That is, when the first camera is connected to apparatus 12, R, G and B signals are displayed as they are, but when the second camera is connected to apparatus 12, matrix processing for forming R, G and B color signals is performed in apparatus 12. When a black-and-white camera is connected, processing for a black-and-white image may be performed in apparatus 12.

In order to discriminate between a color camera and a black-and-white camera, the design of an icon indicating a camera on the display 100 may be changed. For example, in the case of a color camera, a colored icon may be displayed, and in the case of a black-and-white camera, a black-and-white icon may be displayed.

There is the possibility that sensitivity characteristics for colors in a photographing operation may change. For example, if input sensitivity characteristics for colors change depending on the kind of image sensor used, the kind of lens used, the illuminating color temperature in a photographing operation, or the like, the range and characteristics of colors which can be finally reproduced after passing through these image pickup means also changes. Accordingly, when the sensitivity characteristics for colors change, data for reproducing colors stored in the apparatus 12 may be changed. The data may be provided in various forms in accordance with output devices (such as a CRT display, a liquid-crystal display, an ink-jet printer, a thermal printer, an electrophotographic printer (a color laser printer), and the like). Optimum colors may be output from apparatus 12 in accordance with the connected output device.

Furthermore, the method of compressing image data may be changed in accordance with the arrangement of color filters of the image sensor.

When a camera having an AF (autofocus) function has been connected to apparatus 12, the apparatus 12 may receive parameters for AF from the camera unit 11, and instruct the camera unit 11 to perform a focusing operation before starting a photographing operation. In such a case, a warning indicating, for example, permission or prohibition of a focusing operation may, of course, be output to the display 100. In order to clarify that the camera has an AF function, the design of the icon indicating the camera on the display unit may be changed.

Although many other functions and combinations of functions can, of course, be transmitted between camera unit 11 and apparatus 12 and be controlled and processed by apparatus 12, a description thereof will be omitted.

As described above, according to the present invention, when exchanging a camera unit, the information recording/reproducing apparatus automatically updates and changes the configuration and/or processing of the apparatus in accordance with characteristics of the mounted camera unit. Hence, the operator can easily and assuredly connect any camera unit and still all of the capabilities of the camera unit without being annoyed with troublesome setting for controlling operations required for the particular camera.

The individual components shown in outline or designated by blocks in the drawings are all well known in the information recording/reproducing apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information recording/reproducing apparatus for performing a recording/reproducing operation while coupled to a camera which has a memory device, said apparatus comprising:

a memory;

a display means; and processing means for (i) receiving from the camera characteristic data which corresponds to an operational characteristic of the camera, the operational characteristic data including data indicative of a capacity of the camera memory device, (ii) storing the characteristic data in said memory, (iii) performing an information recording/reproducing operation based on the stored characteristic data, (iv) detecting a different camera coupled to said apparatus, the different camera having different operational characteristic data, (v) storing in said memory the operational characteristic data that corresponds to the different camera upon connection of the different camera to the apparatus, (vi) performing a further information recording/reproducing operation based on the stored operational characteristic data of the different camera, and (vii) displaying on said display means the different camera memory capacity, said processing means detecting a condition of a camera battery and providing an output to control a charging means in accordance with the detected battery condition.

2. Apparatus according to claim 1, further comprising display means for displaying the camera characteristic data received by said processing means, and wherein said processing means causes said display means to display the camera characteristic data as the information recording/reproducing operation.

3. Apparatus according to claim 2, wherein said camera has a recording medium having a recording capacity, and wherein said processing means causes said display means to display the recording capacity of the camera recording medium.

4. Apparatus according to claim 2, wherein the camera includes a power supply means having a power capacity, and wherein said processing means causes said display means to display the power capacity of the camera power supply.

5. An information recording/reproducing apparatus for performing a recording/reproducing operation while coupled to a camera which has a memory device, said apparatus comprising:

a memory;

processing means for (i) receiving from the camera characteristic data which corresponds to an operational characteristic of the camera, said characteristic data including data corresponding to a remaining capacity of the camera memory device, (ii) storing the characteristic data in said memory, (iii) performing an information recording/reproducing operation based on the stored characteristic data, (iv) detecting a different camera coupled to the apparatus, the different camera having different operational characteristic data, (v) storing in said memory the operational characteristic data that corresponds to the different camera upon connection of the different camera to the apparatus, and (vi) performing a further information recording/reproducing operation based on the operational characteristic data of the different camera, wherein the change in the connected camera detected by said processing means is a change from a first camera to the different camera which has a different memory device with a different capacity, and wherein said processing means stores in said memory the different memory device capacity as said changed characteristic data, said processing means then performing the further information recording/reproducing operation based on the stored different memory device capacity of the different camera, said processing means detecting a condition of a camera battery and providing an output to control a charging means in accordance with the detected battery condition.

6. Apparatus according to claim 1, wherein said processing means detects any one of the following changes in operational characteristics of the connected camera: continuous photographing speed; allowable exposure time; color temperature of a flash attachment; electric power consumption of the flash attachment; the number of pixels of a camera image sensor; arrangement of color filters of the camera image sensor; and a camera mode-changing switch.

7. Apparatus according to claim 1, wherein said processing means detects any one of the following changes in operational characteristics of the connected camera: an exchange of a camera battery; exchange of a camera exchangeable lens; and lens data including any one of minimum and maximum stop values, color balance, lens aberration information, F number, and zoom information.

8. Apparatus according to claim 1, wherein said processing means detects any one of the following changes in operational characteristics of the connected camera; an exchange of a camera recording medium; a number of photographable frames of the recording medium; a number of remaining recordable frames on the recording medium; and a change in photograph time/date information.

9. Apparatus according to claim 1, wherein said processing means detects any one of the following changes in operational characteristics of the connected camera: electric power consumption; an exchange of the camera battery; remaining power of the camera battery; and the method of charging a camera battery.

10. Apparatus according to claim 1, wherein said processing means detects any one of the following changes in operational characteristics of the connected camera: ambient temperature; ambient humidity; camera vibration; and camera acceleration.

11. An information recording/reproducing apparatus for performing a recording/reproducing operation while coupled to a camera, said apparatus comprising:
a memory; and
processing means for (i) receiving from the camera characteristic data which corresponds to an operational characteristic of the camera, (ii) storing the characteristic data in said memory, (iii) performing an information recording/reproducing operation based on the stored characteristic data, (iv) detecting a change in an operational characteristic of the connected camera, (v) storing in said memory changed characteristic data that corresponds to the detected change in the operational characteristic of the connected camera, and (vi) performing a further information recording/reproducing operation based on the stored changed characteristic data, wherein the camera includes a battery, said apparatus further comprising charging means for charging the camera battery, said processing means detecting a change in power of the camera battery and causing said charging means to be configured to charge the camera battery based on the detected change in the batter power.

12. An information recording/reproducing apparatus for performing a recording/reproducing operation while coupled to a camera, said apparatus comprising:
a memory; and
processing means for (i) receiving from the camera characteristic data which corresponds to an operational characteristic of the camera, (ii) storing the characteristic data in said memory, (iii) performing an information recording/reproducing operation based on the stored characteristic data, (iv) detecting a change in an operational characteristic of the connected camera, (v) storing in said memory changed characteristic data that corresponds to the detected change in the operational characteristic of the connected camera, and (vi) performing a further information recording/reproducing operation based on the stored changed characteristic data, wherein said processing means detects any one of the following changes in operational characteristics of the connected camera: an exchange of a camera battery; exchange of a camera exchangeable lens; and lens data including any one of minimum and maximum stop values, color balance, lens aberration information, F number, and zoom information, wherein said processing means detects a replacement of the camera battery and configures a charging means in accordance with the detected battery replacement.

13. Apparatus according to claim 1, wherein the camera produces image information, and wherein said processing means performs the information recording/reproducing operation of displaying the image information produced by the camera.

14. Apparatus according to claim 1, wherein the camera has a lens unit, and wherein said processing means performs the information recording/reproducing operation of changing at least one of a focus and a magnification of the camera lens unit.

15. Apparatus according to claim 1, wherein the camera has an interface, said apparatus further comprising an apparatus interface and a cable for electrically connecting the camera interface to the apparatus interface.

16. An image pickup apparatus to be detachably coupled to a recording/reproducing device, comprising:
image pickup means for picking up an optical image and outputting an electrical signal corresponding thereto;
a memory device for storing said electrical signal;
interface means for transmitting from said image pickup apparatus to the recording/reproducing apparatus (i) the electrical signal corresponding to the picked-up image, and (ii) characteristic data corresponding to operational characteristics of the image pickup means, said characteristic data being transmitted upon connection of the image pickup apparatus to the recording/reproducing device; and
processing means for detecting a condition of a camera battery and providing an output to control a charging means in accordance with the detected battery condition.

17. Apparatus according to claim 16, wherein said image pickup means includes a power supply, and wherein said interface means transmits characteristic data regarding a power capacity of said power supply.

18. Apparatus according to claim 16, wherein said image pickup means includes an image sensor, and wherein said interface means transmits characteristic data of said image sensor.

19. Apparatus according to claim 16, wherein said interface means transmits characteristic data of at least one of the following operational characteristics of the image pickup means: continuous photographing speed; allowable exposure time; color temperature of a flash attachment; electric power consumption of the flash attachment; the number of pixels of a camera image sensor; arrangement of color filters of the camera image sensor; and a camera mode-changing switch.

20. Apparatus according to claim 16, wherein said interface means transmits characteristic data of at least one of the following operational characteristics of the image pickup means: an exchange of a camera battery; exchange of a camera exchangeable lens; arid lens data including any one of minimum and maximum stop values, color balance, lens aberration information, F number, and zoom information.

21. Apparatus according to claim 16, wherein said interface means transmits characteristic data of at least one of the following operational characteristics of the image pickup means: an exchange of a camera recording medium; a number of photographable frames of the recording medium; a number of remaining recordable frames on the recording medium; and a change in photograph time/date information.

22. Apparatus according to claim 16, wherein said interface means transmits characteristic data of at least one of the following operational characteristics of the image pickup means: electric power consumption; an exchange of the camera battery; remaining power of the camera battery; and the method of charging a camera battery.

23. Apparatus according to claim 16, wherein said interface means transmits characteristic data of at least one of the following operational characteristics of the image pickup means: ambient temperature; ambient humidity; camera vibration; and camera acceleration.

24. An electronic apparatus for use with a camera detachably coupled thereto, said camera receiving an optical image and providing image data corresponding thereto, said camera having a recording medium, said apparatus comprising:
  a memory;
  interface means for receiving from the camera (i) the image data, and (ii) camera characteristic data corresponding to operational characteristic of the camera, the characteristic data including data indicative of the storage capacity of said recording medium, said interface means also receiving different camera characteristic data from a different camera coupled to said apparatus, the different camera characteristic being received when the different camera is coupled to the apparatus;
  processing means for processing the received image data in accordance with the received camera characteristic data, said processing means detecting a condition of a camera battery and providing an output to control a charging means in accordance with the detected battery condition; and
  display means for displaying the recording medium capacity of the recording mediums of first and second different cameras coupled to said apparatus.

25. Apparatus according to claim 24, wherein the camera has a battery, and wherein said interface means receives characteristic data corresponding to the power of the camera battery.

26. Apparatus according to claim 24, wherein the camera has a recording medium, and wherein said interface means receives characteristic data corresponding to a recording capacity of the camera recording medium.

27. Apparatus according to claim 24, wherein said camera includes an image sensor, and wherein said interface means receives characteristic data of the camera image sensor.

28. Apparatus according to claim 24, wherein said processing means detects a change in the camera characteristic data received by the interface means, said processing means processing the image data in accordance with the detected changed camera characteristic data.

29. Apparatus according to claim 28, wherein said processing means detects at least one of the following changed camera operational characteristics: continuous photographing speed; alllowable exposure time; color temperature of a flash attachment; electric power consumption of the flash attachment; the number of pixels of a camera image sensor; arrangement of color filters of the camera image sensor; and a camera mode-changing switch.

30. Apparatus according to claim 28, wherein said processing means detects at least one of the following changed camera operational characteristics: an exchange of a camera battery; exchange of a camera exchangeable lens; and lens data including any one of minimum and maximum stop values, color balance, lens aberration information, F number, and zoom information.

31. Apparatus according to claim 28, wherein said processing means detects at least one of the following changed camera operational characteristics: an exchange of a camera recording medium; a number of photographable frames of the recording medium; a number of remaining recordable frames on the recording medium; and a change in photograph time/date information.

32. Apparatus according to claim 28, wherein said processing means detects at least one of the following changed camera operational characteristics: electric power consumption; an exchange of the camera battery; remaining power of the camera battery; and method of charging the camera battery.

33. Apparatus according to claim 28, wherein said procesing means detects at least one of the following changed camera operational characteristics: ambient temperature; ambient humidity; camera vibration; and camera acceleration.

34. A recording/reproducing apparatus for use with an image pickup device which has a memory and outputs image data and characteristic data corresponding to operational characteristics of the image pickup device, the operational characteristics including a capacity of said memory, said apparatus comprising:
  interface means for receiving the image data and the characteristic data outputted by said image pickup device, said interface means receiving different characteristic data from a different camera when the different camera is coupled to the apparatus;
  memory means for storing the characteristic data received by said interface means;
  initializing means for initializing said recording/reproducing apparatus;
  processing means for changing the characteristic data stored in said memory means upon initialization of said recording/reproducing apparatus by said initializing means, said processing means detecting a condition of a camera battery and providing an output to control a charging means in accordance with the detected battery condition; and
  display means for displaying the memory capacities of different image pickup devices attached to said apparatus.

35. Apparatus according to claim 34, wherein the image pickup device comprises a video camera, and wherein said interface means receives video image data and characteristic data regarding the video camera.

36. Apparatus according to claim 34, further comprising display means for displaying the characteristic data received by said interface means.

37. Apparatus according to claim 36, wherein the image pickup device includes a battery, and wherein said interface means receives battery power capacity data as said characteristic data, and wherein said display means displays the received battery power capacity data.

38. Apparatus according to claim 34, wherein the operational characteristics of the image pickup device can be changed, and wherein said processing means includes means for detecting a change in the received characteristic data corresponding to the changed operational characteristics, and wherein said processing means processes the image data in accordance with the detected changed characteristic data.

39. Apparatus according to claim 38, wherein said processing means detects a change in at least one of the following characteristic data: continuous photographing speed; alllowable exposure time; color temperature of a flash attachment; electric power consumption of the flash attachment; the number of pixels of a camera image sensor; arrangement of color filters of the camera image sensor; and a camera mode-changing switch.

40. Apparatus according to claim 38, wherein said processing means detects a change in at least one of the following characteristic data: an exchange of a camera battery; exchange of a camera exchangeable lens; and lens data including any one of minimum and maximum stop values, color balance, lens aberration information, F number, and zoom information.

41. Apparatus according to claim 38, wherein said processing means detects a change in at least one of the following characteristic data: an exchange of a camera recording medium; a number of photographable frames of the recording medium; a number of remaining recordable frames on the recording medium; and a change in photograph time/date information.

42. Apparatus according to claim 38, wherein said processing means detects a change in at least one of the following characteristic data: electric power consumption; an exchange of the camera battery; remaining power of the camera battery; and the method of charging a camera battery.

43. Apparatus according to claim 38, wherein said means detects a change in at least one of the following characteristic data: ambient temperature; ambient camera vibration; and camera acceleration.

44. An information recording/reproducing apparatus for performing a recording/reproducing operation while connected to a camera, said apparatus comprising:

a memory; and processing means for (i) receiving from the camera characteristic data which corresponds to an operational characteristic of the camera, (ii) storing the characteristic data in said memory, (iii) performing an information recording/reproducing operation based on the stored characteristic data, (iv) detecting a change in an operational characteristic of the connected camera, and (v) storing in said memory changed characteristic data that corresponds to the detected change in the operational characteristic of the connected camera, wherein said processing means detects a condition of the camera battery and provides an output to control a charging means in accordance with the detected battery condition.

\* \* \* \* \*

UNITED STATES PATENT AND TRADEMARK OFFICE
CERTIFICATE OF CORRECTION

PATENT NO. : 5,903,700        Page 1 of 3
DATED : May 11, 1999
INVENTOR(S) : NOBUO FUKUSHIMA It is certified that error appears in the above-identified patent and that said Letters Patent is hereby corrected as shown below:

On the title page,
<u>At [57] ABSTRACT</u>

Line 5, "characteristics" should read --characteristic--.

Line 14, "data" should read --data.--

<u>Column 5</u>

Line 25, "interfaces." should read --interface.--

Line 59, "phing speed" should be deleted.

<u>Column 6</u>

Line 15, "values" should read --value,-- and "balances" should read --balance,--.

Line 16, "numbers" should read --number,--.

Line 25, "temperatures" should read --temperature,--.

Line 26, "temperatures" should read --temperature,--; and "accelerations" should read --acceleration,--.

Line 34, "th" should read --to--.

Line 39, "magnifications" should read --magnification,--.

UNITED STATES PATENT AND TRADEMARK OFFICE
CERTIFICATE OF CORRECTION

PATENT NO. : 5,903,700
DATED : May 11, 1999
INVENTOR(S) : NOBUO FUKUSHIMA

It is certified that error appears in the above-identified patent and that said Letters Patent is hereby corrected as shown below:

Column 9

Line 6, "inventions a detailed" should read --invention, a detailed--.

Column 11

Line 65, "further comprising" should be deleted.

Line 66, "line 66 should be deleted.

Line 67, "received by said processing means, and" should be deleted.

Column 13

Line 33, "batter" should read --battery--.

Column 14

Line 45, "arid" should read --and--.

Column 15

Line 64, "method" should read --a method--.

UNITED STATES PATENT AND TRADEMARK OFFICE
CERTIFICATE OF CORRECTION

PATENT NO. : 5,903,700
DATED : May 11, 1999
INVENTOR(S) : NOBUO FUKUSHIMA

It is certified that error appears in the above-identified patent and that said Letters Patent is hereby corrected as shown below:

<u>Column 17</u>

Line 10, "means" should read --processing means--.

Line 12, "ambient" should read --ambient humidity;--.

Signed and Sealed this

Fourteenth Day of December, 1999

Attest:

Attesting Officer

Q. TODD DICKINSON

Acting Commissioner of Patents and Trademarks